(12) United States Patent
Terahai et al.

(10) Patent No.: US 11,761,899 B2
(45) Date of Patent: Sep. 19, 2023

(54) INSPECTION METHOD AND INSPECTION SYSTEM FOR CYLINDRICAL HONEYCOMB STRUCTURE MADE OF CERAMICS

(71) Applicant: NGK INSULATORS, LTD., Nagoya (JP)

(72) Inventors: Takafumi Terahai, Nagoya (JP); Yoshihiro Sato, Nisshin (JP)

(73) Assignee: NGK INSULATORS, LTD., Nagoya (JP)

( * ) Notice: Subject to any disclaimer, the term of this patent is extended or adjusted under 35 U.S.C. 154(b) by 236 days.

(21) Appl. No.: 17/188,123

(22) Filed: Mar. 1, 2021

(65) Prior Publication Data

US 2021/0302325 A1    Sep. 30, 2021

(30) Foreign Application Priority Data

Mar. 30, 2020    (JP) .................................. 2020-061297

(51) Int. Cl.
*G01N 21/88* (2006.01)
*G01N 21/89* (2006.01)
(Continued)

(52) U.S. Cl.
CPC ..... *G01N 21/8851* (2013.01); *G01N 21/8914* (2013.01); *G01N 21/952* (2013.01);
(Continued)

(58) Field of Classification Search
CPC ........... G01N 21/8851; G01N 21/8914; G01N 21/952; G01N 21/95692; G01N 21/01;
(Continued)

(56) References Cited

U.S. PATENT DOCUMENTS 7,627,163 B2 * 12/2009 Chang .................. G01N 21/952
382/152
8,090,143 B2    1/2012 Komaki et al.
(Continued)

FOREIGN PATENT DOCUMENTS

EP    2 006 666 A2    12/2008
JP    H11-281321 A    10/1999
(Continued)

OTHER PUBLICATIONS

Japanese Office Action (Application No. 2020-061297) dated Aug. 16, 2022 (with English translation).

*Primary Examiner* — Isiaka O Akanbi
(74) *Attorney, Agent, or Firm* — BURR PATENT LAW, PLLC (57) ABSTRACT

A inspection method for a cylindrical honeycomb structure including a step of placing a cylindrical honeycomb structure made of ceramics on a rotation stage; a step of irradiating the side surface of the cylindrical honeycomb structure with light having a wavelength of 300 to 500 nm; a step of repeatedly capturing a reflected light from the side surface with a line sensor camera having a pixel resolution of 1 to 25 μm/pix while the light is irradiated to the side surface and the cylindrical honeycomb structure is rotated around the axis of rotation, with a depth of field of the line sensor camera being adjusted to 0.5 to 5 mm; a step of generating an inspection image of the entire side surface; and a step of determining presence or absence of defects on the side surface based on the inspection image.

10 Claims, 8 Drawing Sheets

(51) Int. Cl.
*H04N 7/18* (2006.01)
*G06T 7/00* (2017.01)
*G01N 21/952* (2006.01)

(52) U.S. Cl.
CPC ........... *G06T 7/0008* (2013.01); *H04N 7/183* (2013.01); *G06T 2207/30108* (2013.01)

(58) Field of Classification Search
CPC ........... G01N 21/88; G01N 2021/0112; G01N 21/9515; G01N 2021/8887; G01N 21/8806; G01N 2021/8877; G06T 7/0008; G06T 2207/30108; G06T 7/0004; G06T 7/0006; G06T 7/66; G06T 2207/30148; G06T 2207/30164; H04N 7/183; H04N 3/155; H04N 5/2352; B25J 15/0004; B25J 15/0253; G01B 21/02; G01B 21/16; G05B 2219/39478
USPC ........................................ 356/237.1–237.6
See application file for complete search history.

(56) References Cited

U.S. PATENT DOCUMENTS

| | | | | |
|---|---|---|---|---|
| 2010/0045975 | A1* | 2/2010 | Zoeller, III | G01N 21/95692 356/239.2 |
| 2010/0238281 | A1* | 9/2010 | Akao | G01N 21/95692 348/92 |
| 2010/0274525 | A1* | 10/2010 | Zoeller, III | G01B 11/2518 356/612 |
| 2011/0116704 | A1* | 5/2011 | Zoeller, III | G01N 21/95692 382/141 |
| 2011/0128370 | A1* | 6/2011 | Booth | G01N 21/952 348/125 |
| 2015/0268174 | A1* | 9/2015 | Citriniti | B28B 19/0038 427/8 |
| 2017/0355102 | A1* | 12/2017 | Citriniti | G01N 21/952 |
| 2017/0365050 | A1* | 12/2017 | Kurahashi | G06T 7/0004 |

FOREIGN PATENT DOCUMENTS

| | | |
|---|---|---|
| JP | 2008-241529 A | 10/2008 |
| JP | 2008-275496 A | 11/2008 |
| WO | 2007/105825 A1 | 9/2007 |
| WO | 2017/061318 A1 | 4/2017 |

* cited by examiner

FIG. 1

Exhaust gas

INSPECTION METHOD AND INSPECTION SYSTEM FOR CYLINDRICAL HONEYCOMB STRUCTURE MADE OF CERAMICS

FIELD OF THE INVENTION

The present invention relates to an inspection method and an inspection system for inspecting a cylindrical honeycomb structure made of ceramics.

BACKGROUND OF THE INVENTION

Cylindrical honeycomb structures made of ceramics, which are excellent in heat resistance, thermal shock resistance, and oxidation resistance, have been widely used as a filter for collecting particulate matter contained in the exhaust gas from an internal combustion engine, a boiler, etc. and as a catalyst carrier for exhaust gas purification catalysts.

Generally, a cylindrical honeycomb structure made of ceramics comprises a side surface, and a plurality of partition walls disposed on the inner peripheral side of the side surface, the partition walls partitioning a plurality of cells extending in the height direction from a first end surface to a second end surface. The cylindrical honeycomb structure made of ceramics can be manufactured, for example, through a step of kneading a powder of ceramic raw material as the constituent material with an organic binder, water, etc. to and the like to obtain a clay-like green body and forming the green body into a cylindrical honeycomb formed body with an extrusion molding method, and a step of firing the cylindrical honeycomb formed body.

After firing, defects such as cracks or foreign substances adhering to the side surface of the cylindrical honeycomb structure may occur. The occurrence of cracks and the adhesion of foreign substances may lead to a decrease in the strength of the cylindrical honeycomb structure, a decrease in filtration performance when the cylindrical honeycomb structure is used as a filter, and a decrease in exhaust gas purification performance when it is used as a catalyst carrier. Therefore, it is necessary to inspect the presence or absence of defects on the side surface of the cylindrical honeycomb structure.

As a method for inspecting the side surface of a cylindrical honeycomb structure, there is known a method of inspecting the presence or absence of defects by capturing the side surface while rotating the cylindrical honeycomb structure with a line sensor camera. Patent Literature 1 (WO 2017/061318) discloses a method for surface inspection that can determine the presence or absence of cracks formed on the side surface of the honeycomb structure with a simple method comprising imaging with two illumination lights with different irradiation directions and wavelength bands, and comparing two images for determination which are generated based on the imaging result.

CITATION LIST

Patent Literature

[Patent Literature 1] WO 2017/061318

SUMMARY OF THE INVENTION

According to Patent Literature 1, by imaging the side surface of a honeycomb structure using two illumination lights with different irradiation directions and wavelength bands, and comparing the two images for determination which are generated based on the imaging result, it is possible to distinguish between cracks and swells (surface undulations) that do not cause quality problems, and prevent excessive detection. However, the technique of Patent Literature 1 does not sufficiently deal withs fine cracks. Therefore, it is desirable to provide an inspection method capable of quickly inspecting the presence or absence of fine defects (for example, cracks having a width of about 5 to 25 μm) on the side surface of the cylindrical honeycomb structure made of ceramics.

The present invention has been made in view of the above circumstances, and according to one embodiment, an object is to provide an inspection method capable of quickly inspecting the presence or absence of fine defects on the side surface of a cylindrical honeycomb structure made of ceramics. Further, according to another embodiment, an object is to provide an inspection system suitable for carrying out such an inspection method.

Although it is necessary to use a camera with fine pixel resolution in order to detect fine defects, the outer shape of a cylindrical honeycomb structure may be not a mathematically perfect cylinder, and dimensional errors may occur. Therefore, when the entire side surface is inspected with a line sensor camera while rotating the cylindrical honeycomb structure, the distance between the camera and the cylindrical honeycomb structure fluctuates slightly. If the fluctuation of the distance exceeds the depth of field, a focused image cannot be obtained. Therefore, it is necessary to increase the depth of field in order to cope with the dimensional errors. However, if the F value (aperture value) is increased in order to increase the depth of field, there is a problem that the diameter of the Airy disk becomes large and the inspection accuracy decreases.

As a result of diligent studies to deal with this problem, the present inventors have found that fine cracks can be detected while obtaining a depth of field capable of coping with dimensional errors by irradiating the cylindrical honeycomb structure, which is the object, with light of a short wavelength while increasing the F value (aperture value), and capturing the reflected light. The present invention has been completed based on the above findings, and is exemplified as below.

[1]

An inspection method for a cylindrical honeycomb structure, comprising:
- a step of preparing a cylindrical honeycomb structure made of ceramics, which comprises a first end surface, a second end surface, and a side surface;
- a step of placing the cylindrical honeycomb structure on a rotation stage so that the first end surface is on the topside and a distance between a center of gravity of the first end surface and an axis of rotation of the rotation stage is 0.5 mm or less;
- a step of irradiating the side surface of the cylindrical honeycomb structure placed on the rotation stage with light having a wavelength of 300 to 500 nm;
- a step of repeatedly capturing a reflected light from the side surface with a line sensor camera having a pixel resolution of 1 to 25 μm/pix while the light is irradiated to the side surface and the cylindrical honeycomb structure is rotated around the axis of rotation, with a depth of field of the line sensor camera being adjusted to 0.5 to 5 mm;
- a step of generating an inspection image of the entire side surface based on a result of the step of capturing the reflected light with the line sensor camera; and a step of determining presence or absence of defects on the side surface based on the inspection image.

[2]
The inspection method for a cylindrical honeycomb structure according to [1], wherein the step of repeatedly capturing the reflected light from the side surface with the line sensor camera is carried out by setting an aperture value F of the line sensor camera in a range of 8 to 16.

[3]
The inspection method for a cylindrical honeycomb structure according to [1] or [2], wherein the step of determining the presence or absence of defects on the side surface based on the inspection image comprises determining presence or absence of cracks having a width of 5 to 25 μm.

[4]
The inspection method for a cylindrical honeycomb structure according to any one of [1] to [3], wherein the rotation stage is capable of moving in X, Y, and Z directions, and the step of placing the cylindrical honeycomb structure on the rotation stage comprises:
 a step of measuring a position of the center of gravity of the first end surface using an area camera;
 a step of moving the axis of rotation of the rotation stage directly below the position of the center of gravity of the first end surface based on a measured position of the center of gravity of the first end surface; and
 a step of raising the rotation stage relative to the cylindrical honeycomb structure and lifting the cylindrical honeycomb structure from a side of the second end surface.

[5]
The inspection method for a cylindrical honeycomb structure according to any one of [1] to [4], comprising:
 a step of continuously measuring a distance between any point on the side surface and a displacement meter in the normal direction at the point using the displacement meter while carrying out the step of repeatedly capturing the reflected light from the side surface with the line sensor camera, and determining whether or not an amount of change in the distance during one rotation of the cylindrical honeycomb structure exceeds the depth of field; and
 if the depth of field is exceeded, a step of adjusting an imaging distance so that at least a part of the side surface which is captured with the depth of field exceeded is within the range of the depth of field, and then re-rotating the cylindrical honeycomb structure around the axis of rotation and capturing at least the part with the line sensor camera.

[6]
The inspection method for a cylindrical honeycomb structure according to [5], wherein the displacement meter measures a distance between any point in a lower half of the side surface of the cylindrical honeycomb structure and the displacement meter in the normal direction at the point.

[7]
The inspection method for a cylindrical honeycomb structure according to any one of [1] to [6], wherein the step of repeatedly capturing the reflected light from the side surface with the line sensor camera is carried out while rotating the cylindrical honeycomb structure at an average peripheral speed of 100 to 1000 mm/sec.

[8]
The inspection method for a cylindrical honeycomb structure according to any one of [1] to [7], wherein an illuminance on the side surface of the cylindrical honeycomb structure irradiated with the light is 500,000 lx or more.

[9]
The inspection method for a cylindrical honeycomb structure according to any one of [1] to [8], wherein the light irradiated to the side surface of the cylindrical honeycomb structure is irradiated by a line illumination whose longitudinal direction extends in a direction parallel to a central axis direction of the cylindrical honeycomb structure.

[10]
An inspection system for carrying out the inspection method for a cylindrical honeycomb structure according to any one of [1] to [9], comprising:
 a rotation stage capable of moving in X, Y, and Z directions;
 a light irradiator for irradiating the side surface of the cylindrical honeycomb structure with light;
 a line sensor camera for capturing a reflected light from the side surface of the cylindrical honeycomb structure; and
 a screen capable of displaying an inspection image.

According to one embodiment of the present invention, it is possible to quickly inspect the presence or absence of fine defects (for example, cracks having a width of about 5 to 25 μm) on the side surface of a cylindrical honeycomb structure made of ceramics.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention.

(1. Cylindrical Honeycomb Structure)

In one embodiment of the inspection method according to the present invention, the inspection target is a cylindrical honeycomb structure made of ceramics, which comprises a first end surface, a second end surface, and a side surface. As the ceramics constituting the cylindrical honeycomb structure, though not limited to, but preferably, ceramic comprising at least one selected from the group consisting of cordierite, mullite, zircon, aluminum titanate, silicon carbide, silicon-silicon carbide composite, silicon nitride, zirconia, spinel, indialite, sapphirine, corundum, and titania may be mentioned for example. In addition, for these ceramics, one type may be contained alone, or two or more types may be contained at the same time.

Figure 1:
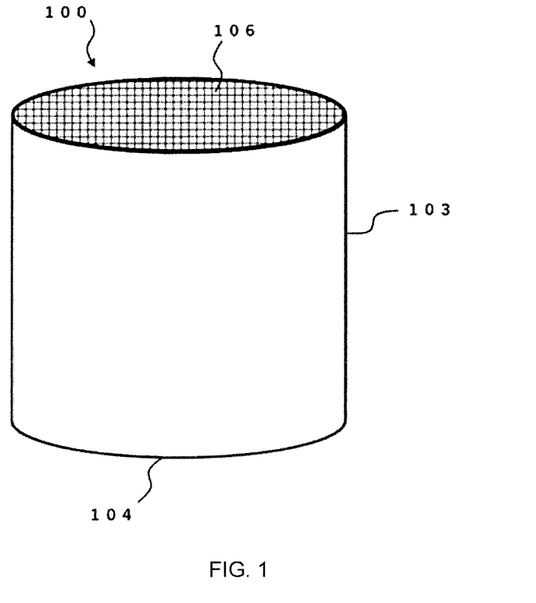
FIG. 1 is a perspective view schematically showing a wall-through type pillar-shaped honeycomb structure.
Figure 2:
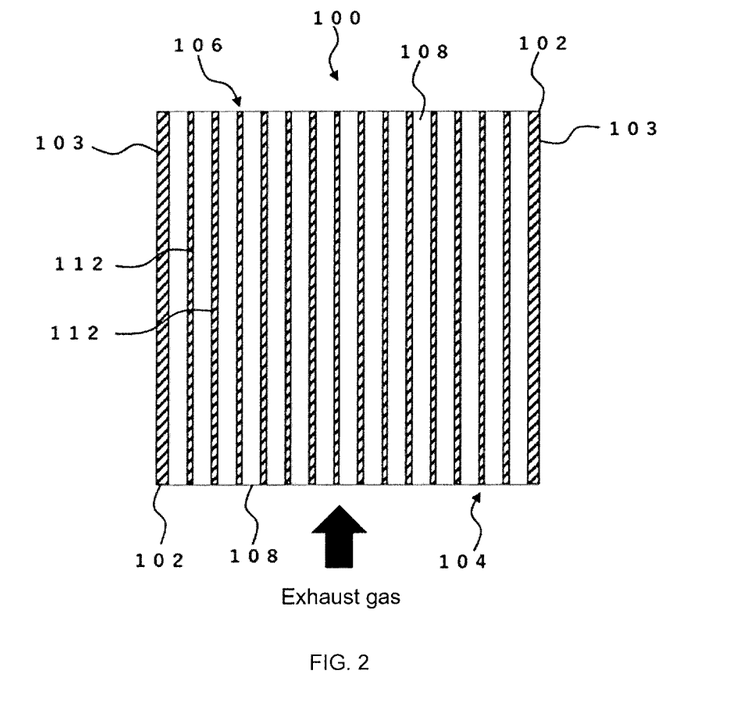
FIG. 2 is a schematic cross-sectional view of a wall-through type pillar-shaped honeycomb structure observed in a cross-section parallel to the direction in which the cells extend.

FIGS. 1 and 2 illustrate a schematic perspective view and a cross-sectional view of a cylindrical honeycomb structure (100) that can be used as a wall through type exhaust gas filter and/or catalyst carrier for automobiles, respectively. The cylindrical honeycomb structure (100) comprises an outer peripheral side wall (102), and partition walls (112) disposed on an inner peripheral side of the outer peripheral side wall (102), the partition walls (112) partitioning a plurality of cells (108) forming flow paths for fluid from a first end surface (104) to a second end surface (106). The outer surface of the outer peripheral side wall (102) forms the side surface (103) of the cylindrical honeycomb structure (100). In this cylindrical honeycomb structure (100), both ends of each cell (108) are open, and an exhaust gas flowing into each cell (108) from the first end surface (104) is purified while passing through the cell, and flows out of the second end surface (106). Here, the first end surface (104) is on the upstream side of the exhaust gas and the second end surface (106) is on the downstream side of the exhaust gas, but this difference between the first end surface and the second end surface is for the sake of convenience, and the second end surface (106) may be on the upstream side of the exhaust gas, and the first end surface (104) may be on the downstream side of the exhaust gas.

Figure 3:
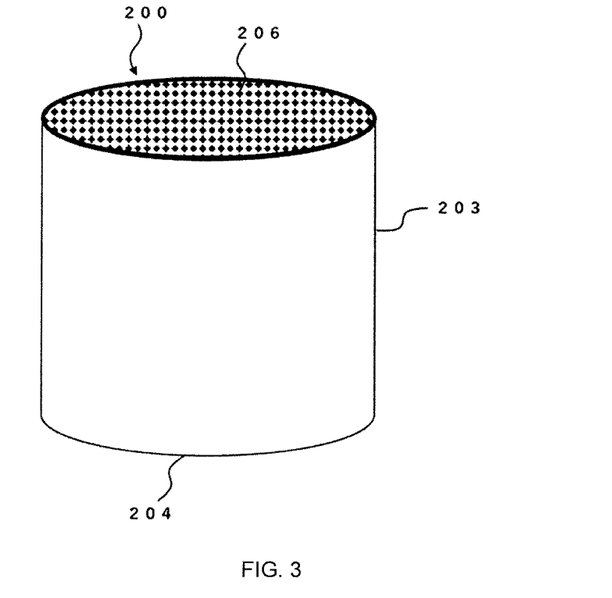
FIG. 3 is a perspective view schematically showing a wall-flow type pillar-shaped honeycomb structure.
Figure 4:
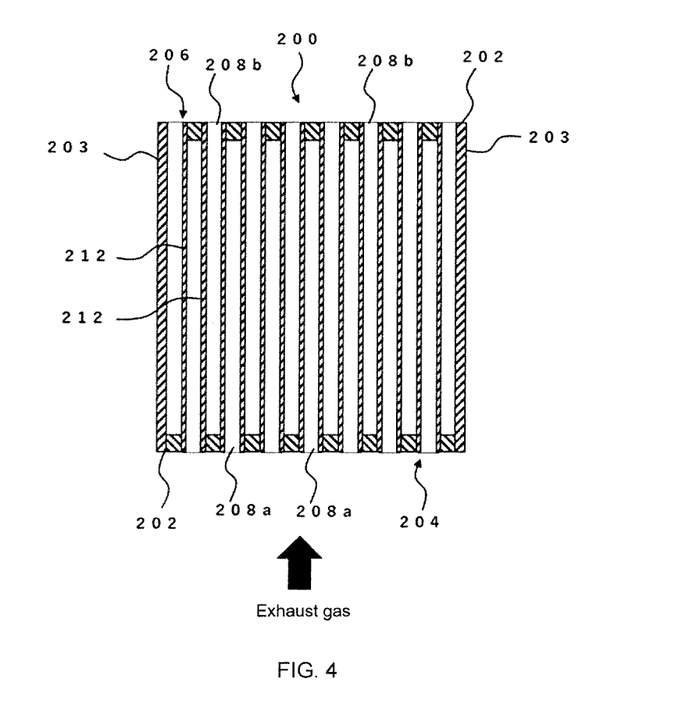
FIG. 4 is a schematic cross-sectional view of a wall-flow type pillar-shaped honeycomb structure observed in a cross-section parallel to the direction in which the cells extend.

FIGS. 3 and 4 illustrate a schematic perspective view and a cross-sectional view of a cylindrical honeycomb structure (200) that can be used as a wall-flow type exhaust gas filter and/or catalyst carrier for automobiles, respectively. The cylindrical honeycomb structure (200) comprises an outer peripheral side wall (202) and partition walls (212) disposed on an inner peripheral side of the outer peripheral side wall (202), the partition walls (212) partitioning a plurality of cells (208a, 208b) forming flow paths for fluid from a first end surface (204) to a second end surface (206). The outer surface of the outer peripheral side wall (202) forms the side surface (203) of the cylindrical honeycomb structure (200).

In the cylindrical honeycomb structure (200), the plurality of cells (208a, 208b) can be classified into a plurality of first cells (208a) extending from the first end surface (204) to the second end surface (206), opening on the first end surface (204) and being sealed on the second end surface (206), and a plurality of second cells (208b) disposed on the inner peripheral side from the outer peripheral side wall (202), extending from the first end surface (204) to the second end surface (206), being sealed on the first end surface (204) and opening on the second end surface (206). Further, in this cylindrical honeycomb structure (200), the first cells (208a) and the second cells (208b) are alternately arranged adjacent to each other with the partition walls (212) interposed therebetween.

When an exhaust gas containing particulate matter such as soot is supplied to the first end surface (204) on the upstream side of the cylindrical honeycomb structure (200), the exhaust gas is introduced into the first cells (208a) and proceeds downstream in the first cells (208a). Because the first cells (208a) are sealed on the second end surface (206) on the downstream side, the exhaust gas passes through the porous partition walls (212) that partition the first cells (208a) and the second cells (208b) and flows into the second cells (208b). Since particulate matter cannot pass through the partition walls (212), it is collected and deposited in the first cells (208a). After the particulate matter is removed, the cleaned exhaust gas that has flowed into the second cells (208b) proceeds downstream in the second cells (208b) and flows out of the second end surface (206) on the downstream side. Here, the first end surface (204) is on the upstream side of the exhaust gas and the second end surface (206) is on the downstream side of the exhaust gas, but this difference between the first end surface and the second end surface is for the sake of convenience, and the second end surface (206) may be on the upstream side of the exhaust gas, and the first end surface (204) may be on the downstream side of the exhaust gas.

Each end surface of the cylindrical honeycomb structure is circular, and the diameter thereof is not particularly limited, but can be, for example, 50 to 400 mm, and typically 50 to 200 mm.

The shape of the cells in the cross-section perpendicular to the flow path direction of the cells is not limited, but is preferably a quadrangle, a hexagon, an octagon, or a combination thereof. Among these, square and hexagon are preferred. By making the cell shape in this way, the pressure loss when fluid passes through the pillar-shaped honeycomb structure is reduced, and the purification performance of catalyst become excellent.

The cell density (number of cells per unit cross-sectional area) is also not particularly limited, but for example, it can be 6 to 2000 cells/square inch (0.9 to 311 cells/cm$^2$). Here, the cell density is calculated by dividing the number of cells on one of the end surfaces (including the sealed cells) by the area of the one end surface excluding the outer peripheral side wall.

The thickness of the partition walls is also not particularly limited, but may be, for example, 50 μm to 330 μm.

The height of the cylindrical honeycomb structure (the length from the first end surface to the second end surface) is also not particularly limited, but may be, for example, 40 mm to 300 mm.

The cylindrical honeycomb structure can be manufactured by a known manufacturing method, but will be described below as an example. First, a raw material composition containing a ceramic raw material, a dispersion medium, a pore former and a binder is kneaded to form a green body. Then, by extrusion molding of the green body, a desired cylindrical honeycomb formed body is prepared. After that, a cylindrical honeycomb structure is prepared by drying, degreasing, and firing the cylindrical honeycomb formed body. If sealing portions are to be formed, the cylindrical honeycomb formed body is dried, and then predetermined sealing portions are formed on both end surfaces of the cylindrical honeycomb formed body and then dried. After that, a cylindrical honeycomb structure is prepared by degreasing and firing the cylindrical honeycomb formed body having sealing portions.

The use of the cylindrical honeycomb structure is not particularly limited. But for example, it is used in various industrial applications such as heat sinks, filters (for example, GPF, DPF), catalyst carriers, sliding parts, nozzles, heat exchangers, electrical insulation members and parts for semiconductor manufacturing devices.

(2. Inspection Method and Inspection System)

According to one embodiment of the present invention, there is provided an inspection method for a cylindrical honeycomb structure made of ceramics comprising a first end surface, a second end surface, and a side surface. Further, according to one embodiment of the present invention, there is provided an inspection system suitable for carrying out the inspection method.

2-1. Overview of Inspection System

Figure 5:
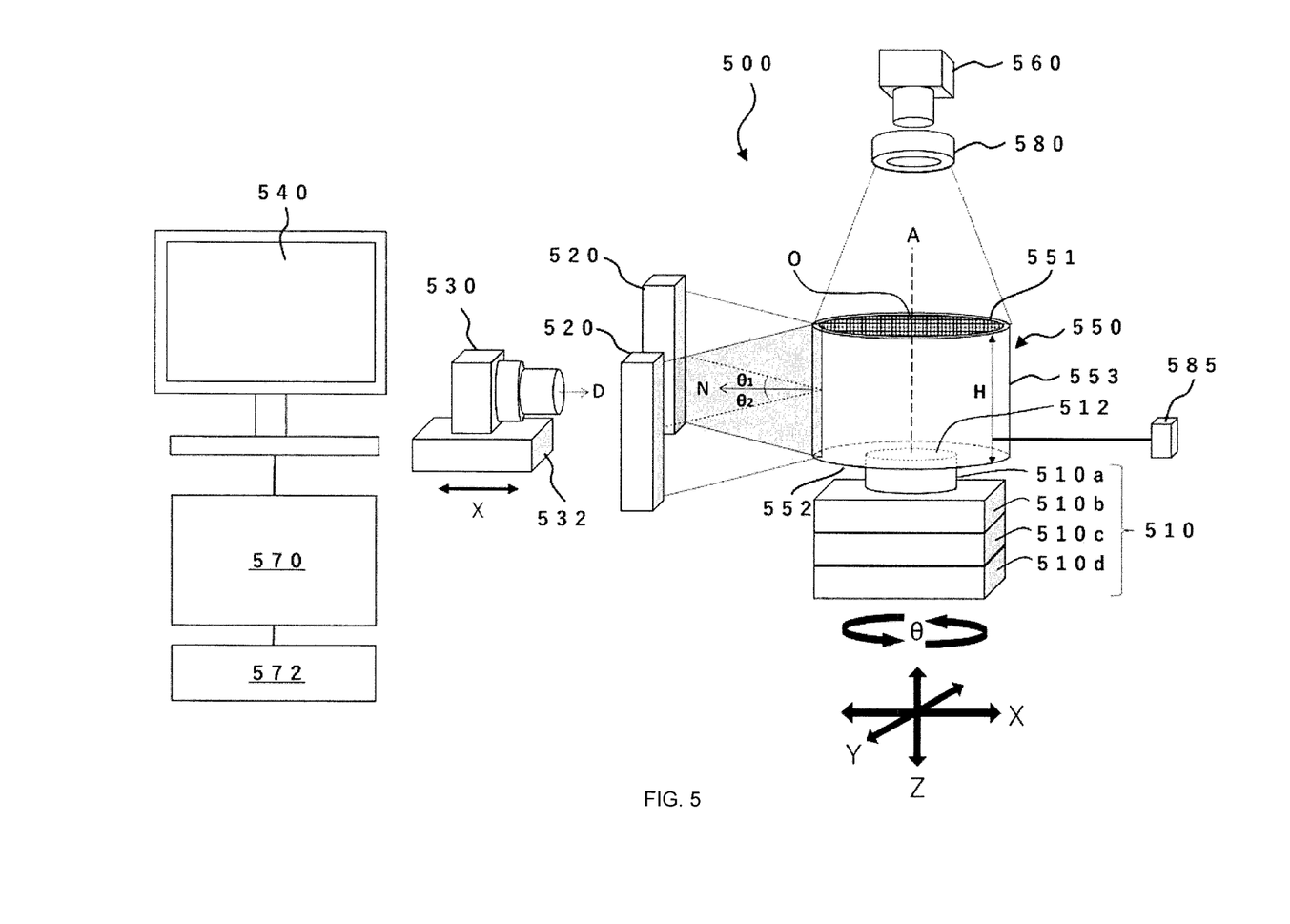
FIG. 5 is a schematic side view for illustrating a configuration of an inspection system according to one embodiment of the present invention.

FIG. 5 shows a schematic side view for illustrating the configuration of an inspection system (500) suitable for carrying out the inspection method according to one embodiment of the present invention. In one embodiment, the inspection system (500) may comprise a rotation stage (510) capable of moving in the X, Y, and Z directions for placing a cylindrical honeycomb structure (550); a light irradiator (520) for irradiating the side surface (553) of the cylindrical honeycomb structure (550) with light; a line sensor camera (530) for capturing the reflected light from the side surface (553) of the cylindrical honeycomb structure (550); and a screen (540) capable of displaying an inspection image.

In one embodiment, the inspection system (500) may comprise a light irradiator (520) capable of irradiating the side surface (553) of the cylindrical honeycomb structure (550) placed on the rotation stage (510) with light.

In one embodiment, the inspection system (500) may comprise an area camera (560) capable of capturing the first end surface (551) of the cylindrical honeycomb structure (550) placed on the rotation stage (510) from above.

In one embodiment, the inspection system (500) may comprise a light irradiator (580) capable of irradiating the first end surface (551) of the cylindrical honeycomb structure (550) placed on the rotation stage (510) with light from above.

In one embodiment, the inspection system (500) may comprise a displacement meter (585) capable of measuring the distance from any point on the side surface (553) of the cylindrical honeycomb structure (550) placed on the rotation stage (510) in the normal direction at the point.

In one embodiment, the inspection system (500) may comprise an X stage (532) capable of moving in the X direction with the line sensor camera (530) placed on it.

In one embodiment, the inspection system (500) may comprise a controller (570). The controller (570) is configured to be able to control the movement of each component constituting the inspection system (500). The details of control that can be performed by the controller (570) are exemplified as below.

The controller (570) may be configured to control the operating conditions of the line sensor camera (530) (setting of various conditions, start and stop of capturing, and the like).

The controller (570) may be configured to be able to display the inspection image on the screen (540) based on the image data obtained by the line sensor camera (530).

The controller (570) may be configured to perform image processing on the image obtained by the line sensor camera (530) and determine the presence or absence of defects based on the result of image processing.

The controller (570) may be configured to be able to control various operating conditions (start of rotation, stop of rotation, rotation speed, and the like) of the rotation stage (510).

The controller (570) may be configured to be able to measure the position of the rotation stage (510) based on the imaging result of the area camera (560), and control the movement of the rotation stage (510) in the X, Y, and Z directions.

The controller (570) may be configured to be able to control various operating conditions (ON/OFF, output, or the like) of the light irradiator (520, 580).

The controller (570) may be configured to be able to control various operating conditions (ON/OFF, or the like) of the displacement meter (585).

The controller (570) may be configured to be able to control the movement of the X stage (532) in the X direction.

The inspection system (500) may comprise an input unit (572) for inputting instructions and/or conditions for performing various controls executed by the controller (570). The input unit (572) may be composed of, for example, a keyboard, a touch panel, a numeric keypad, a mouse, or the like. The instructions and/or conditions input by the input unit (572) may also be configured to be displayed on the screen (540).

2-2. Step of Placing Cylindrical Honeycomb Structure

In the inspection method according to one embodiment of the present invention, a step of placing a cylindrical honeycomb structure (550) on a rotation stage (510) is carried out. The cylindrical honeycomb structure (550) is placed so that one of the end surfaces thereof is in contact with a placing surface (512) of the rotation stage (510). When the cylindrical honeycomb structure (550) is placed on the rotation stage (510), assuming that the end surface on the topside is the first end surface (551), it is desirable to place it so that the distance between the center of gravity O of the first end surface (551) and the axis of rotation A of the rotation stage (510) is 0.5 mm or less, preferably 0.2 mm or less, and more preferably 0.1 mm or less. In this way, when the cylindrical honeycomb structure (550) rotates on the rotation stage (510), there is an advantage that the eccentricity is reduced and the object distance is stable, so that even if the depth of field is not excessively increased, the line sensor camera (530) can be in focus when capturing the side surface (553).

The rotation stage (510) has a horizontal placing surface (512) on which the cylindrical honeycomb structure (550) can be placed. The placing surface (512) of the rotation stage (510) is preferably smaller than the size of the end surfaces (551, 552) of the cylindrical honeycomb structure (550). This is to prevent the figures of the rotation stage (510) from being imaged when capturing with the line sensor camera (530).

The rotation stage (510) has a θ stage (510a) having an axis of rotation A extending in the vertical direction. The rotation stage (510) is configured to be rotatable at a predetermined rotation speed by a driving means such as a servomotor. The servomotor may be equipped with an encoder for detecting a displacement amount such as the rotation angle of the rotation stage (510) or the like.

Further, the rotation stage (510) is configured to be capable of moving in the X and Y directions (generally the horizontal direction) and the Z direction (generally the vertical direction) by a driving means such as a motor. More specifically, the rotation stage (510) comprises an X stage (510b) and a Y stage (510c) which enable horizontal movement, and a Z stage (510d) which enables vertical movement. The X stage, the Y stage, and the Z stage can be independently moved by a driving means such as a motor. Illustratively, the X stage, the Y stage, and the Z stage can each be configured by using an electric actuator such as a ROBO cylinder. The electric actuator can be composed of a linear guide, a ball screw, and a servomotor, etc. The servomotor may be equipped with an encoder for detecting the displacement amount of each stage.

In order to accurately position the cylindrical honeycomb structure (550) on the rotation stage (510), in the step of placing the cylindrical honeycomb structure (550) on the rotation stage (510), it is preferable to perform the following positioning operation using an area camera (560) provided above the first end surface (551) of the cylindrical honeycomb structure (550).

In one embodiment, the positioning operation comprises:
- a step of measuring a position of the center of gravity O of the first end surface (551) using the area camera (560);
- a step of moving the axis of rotation A of the rotation stage (510) directly below the position of the center of gravity O of the first end surface based on the measured position of the center of gravity O of the first end surface (551); and
- a step of raising the rotation stage (510) relative to the cylindrical honeycomb structure (550) and lifting the cylindrical honeycomb structure (550) from a side of the second end surface (552).

FIG. 6A to 6D schematically show an example of the procedure of the positioning operation. First, the cylindrical honeycomb structure (550) is placed on a frame (590). The frame (590) has a horizontal placing surface (591) on which the cylindrical honeycomb structure (550) can be placed. The placing surface (591) has an opening (592), and the rotation stage (510) is disposed below the opening (592).

Figure 6A:
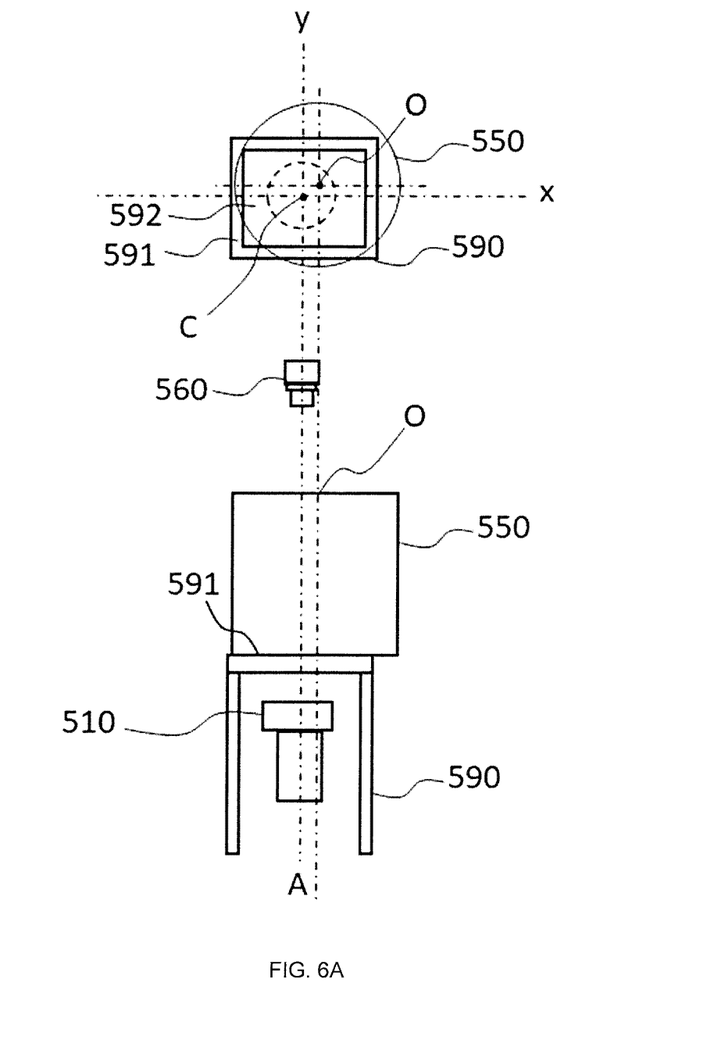
FIG. 6A is a schematic view showing a state when the position of the center of gravity O of the first end surface is measured based on the result of capturing the first end surface by the area camera.

The first end surface (551), which is the end surface on the top side of the cylindrical honeycomb structure (550) placed on the frame (590), is captured by the area camera (560) provided above the first end surface (551). The controller (570) measures the position (typically, the values of the X and Y coordinates) of the center of gravity O of the first end surface (551) based on the imaging result of the first end surface (551) by the area camera (560) (FIG. 6A). The position of the center of gravity O of the first end surface (551) can be specified by methods such as a method determining the center of gravity by obtaining the arithmetic mean of the coordinate values of all the pixels constituting the first end surface (551), or a method of performing circle fitting on the outer peripheral contour of the first end surface (551) and determining by setting the center of the circle as the center of gravity.

Figure 6B:
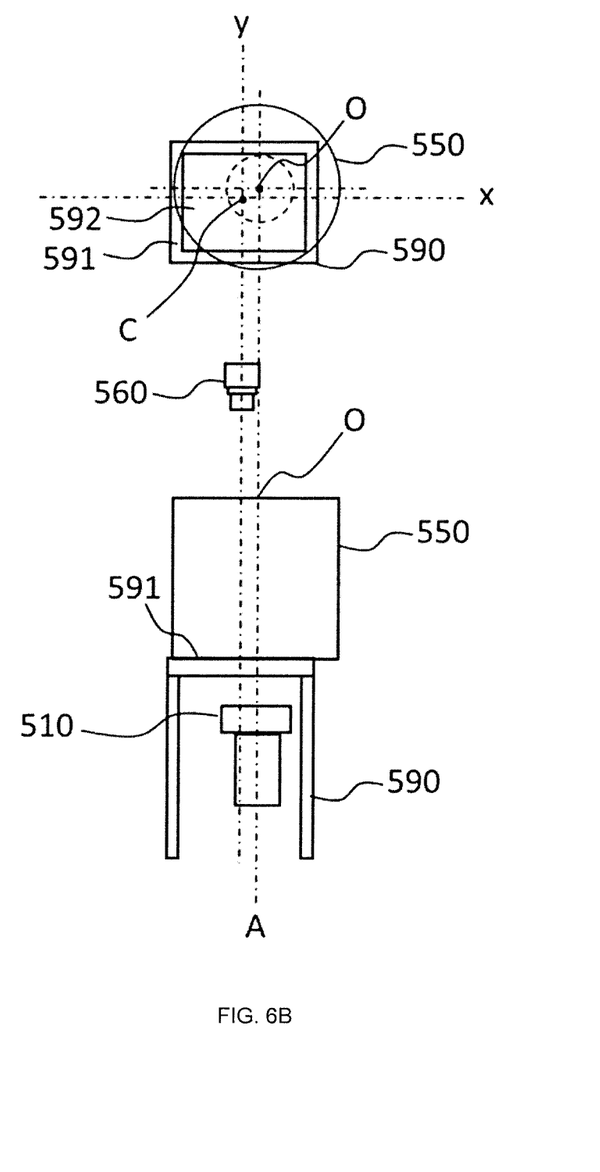
FIG. 6B is a schematic view showing a state when the axis of rotation A of the rotation stage moves directly below the position of the center of gravity O of the first end surface based on the measured position of the center of gravity O of the first end surface.

The controller (570) is configured to be able to measure the position (typically, the values of the X and Y coordinates) of the axis of rotation A of the rotation stage (510). The controller (570) is able to move the axis of rotation A of the rotation stage (510) directly below the position of the center of gravity O of the first end surface based on the measured position of the center of gravity O of the first end surface (551) (FIG. 6B).

Figure 6C:
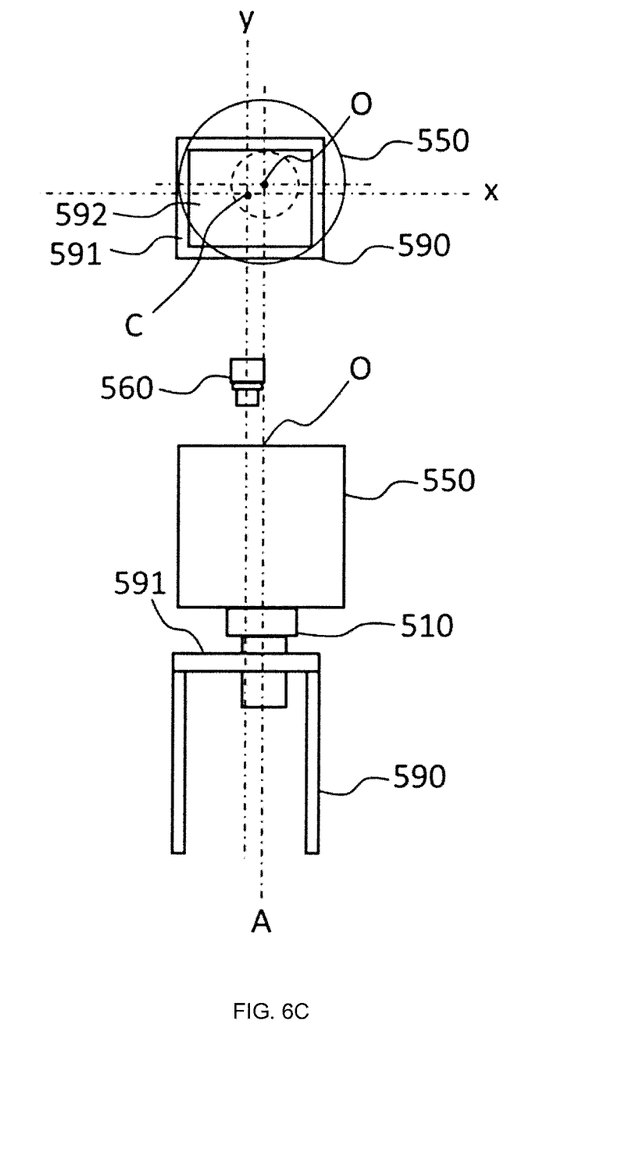
FIG. 6C is a schematic view showing a state when the rotation stage rises relative to the cylindrical honeycomb structure and lifts the cylindrical honeycomb structure from the side of the second end surface.

The controller (570) is able to move the rotation stage (510) in the Z direction whose axis of rotation A has been moved directly below the position of the center of gravity O of the first end surface (551). Therefore, the rotation stage (510) can be raised relative to the cylindrical honeycomb structure (550), thereby lifting the cylindrical honeycomb structure (550) from the side of the second end surface (552). (FIG. 6C). By this operation, it is possible to match the position of the center of gravity O of the first end surface (551) with the position of the axis of rotation A of the rotation stage (510) with a high accuracy.

Figure 6D:
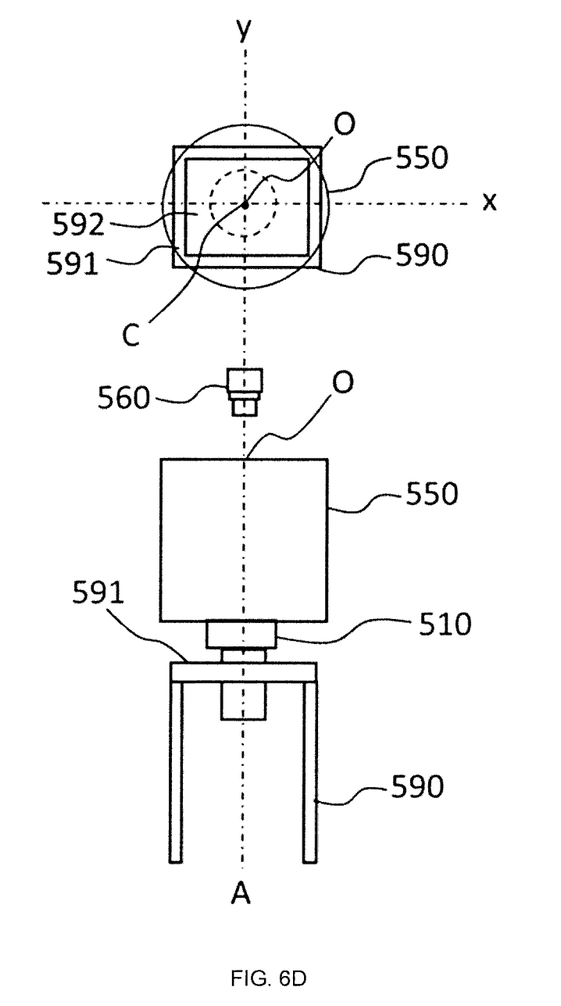
FIG. 6D is a schematic view showing a state when the cylindrical honeycomb structure lifted by the rotation stage is moved to a predetermined inspection center C.

Further, for the cylindrical honeycomb structure (550) lifted by the rotation stage (510), it is preferable to move the cylindrical honeycomb structure (550) to a predetermined inspection center C so that the axis of rotation A and the center of gravity O are on the center of the optical axis of the line sensor camera (530) (FIG. 6D). For example, the inspection center C may be set to a coordinate value of (x, y)=(0,0) in a predetermined XY coordinate system, and the controller (570) may move the cylindrical honeycomb structure (550) so that the center of gravity O of the first end surface (551) comes to the position of (x, y)=(0,0) in the XY coordinate system.

The area camera (560) is preferably provided so that the normal direction of the placing surface (512) of the rotation stage (510) is parallel to the capturing direction in order to improve the positioning accuracy. As the area camera (560), although it is not limited, for example, a monochrome area camera having a performance of 2 million pixels or more can be used.

In order to improve the positioning accuracy, it is preferable to carry out the capturing of the first end surface (551) by the area camera (560) while irradiating the first end surface (551) with light from a light irradiator (580) provided above the first end surface (551). Further, in order to improve the positioning accuracy, it is preferable that the light from the light irradiator (580) be isotropically applied to the first end surface (551) which is captured by the area camera (560). For example, a method of irradiating light from directly above the first end surface (551) with a ring illumination, a coaxial illumination, or the like as the light irradiator (580) is preferable.

The light source of the light irradiator (580) is not particularly limited, and examples thereof include an LED, an incandescent light bulb, and a halogen lamp. The wavelength of the light to be irradiated is also not particularly limited as long as the area camera (560) has a light sensitivity to the wavelength. Therefore, it is also possible to irradiate white light. The output of the light to be irradiated is also not particularly limited, but in order to improve the positioning accuracy, the light may be irradiated at an output such that the illuminance of the first end surface (551) is 2,000 lx or more, preferably 5,000 lx or more.

2-3. Step of Irradiating Side Surface

In the inspection method according to one embodiment of the present invention, a step of irradiating the side surface (553) of the cylindrical honeycomb structure (550) placed on the rotation stage (510), preferably the side surface (553) of the cylindrical honeycomb structure (550) for which the positioning operation has been completed, with light having a wavelength of 300 to 500 nm is carried out. By irradiating the side surface (553) with light having such a short wavelength, the diameter of the Airy disk when the reflected light from the side surface (553) is captured by the line sensor camera (530) can be reduced. The upper limit of the wavelength of the light irradiated to the side surface (553) is preferably 500 nm or less, more preferably 450 nm or less, and even more preferably 400 nm or less. However, if the wavelength of the light irradiated to the side surface (553) is too short, the sensitivity of the line sensor camera is insufficient and an image with sufficient brightness may not be obtained. Therefore, the lower limit of the wavelength of the light irradiated to the side surface (553) is preferably 300 nm or more, more preferably 350 nm or more, and even more preferably 400 nm or more.

In one embodiment, the inspection system (500) comprises a light irradiator (520) capable of irradiating the side surface (553) of the cylindrical honeycomb structure (550) placed on the rotation stage (510) with light having such a short wavelength. The light source of the light irradiator (520) is not particularly limited, and examples thereof include an LED and a halogen lamp.

From the viewpoint of facilitating the detection of fine defects (for example, cracks having a width of about 5 to 25 μm), The light irradiator (520) preferably illuminates the part of the side surface (553) of the cylindrical honeycomb structure (550) captured by the line sensor camera (530) with high illuminance. Specifically, it is desirable to adjust the intensity of the light to be irradiated so that the illuminance of the side surface (553) of the cylindrical honeycomb structure (550) is 500,000 lx or more, preferably 550,000 lx or more, and more preferably 600,000 lx or more. There is no particular upper limit to the illuminance of the side surface (553) of the cylindrical honeycomb structure (550) irradiated with the irradiation light, but from the viewpoint of economy, the illuminance of the side surface (553) of the cylindrical honeycomb structure (550) is preferably 1 million lx or less.

The side surface (553) of the cylindrical honeycomb structure (550) is captured by the line sensor camera (530). Therefore, when the side surface (553) of the cylindrical honeycomb structure (550) is captured by the line sensor camera (530), the range that can be captured in one shot is usually an elongated range extending linearly in the central axis direction of the cylindrical honeycomb structure (550). Therefore, it is preferable to use line illumination for the light irradiator (520) because it is efficient in increasing the illuminance. Specifically, it is preferable that the light irradiated to the side surface (553) of the cylindrical honeycomb structure (550) is irradiated by a line illumination whose longitudinal direction extends in a direction parallel to the central axis direction of the cylindrical honeycomb structure (550). Further, for the line illumination, it is preferable to set the irradiation direction of the light so as to illuminate the imaging range of the line sensor camera (530).

When the line illumination is used as the light irradiator (520), as shown in FIG. 5, it is preferable to arrange one or more pairs of the light irradiators (520) at symmetrical positions (typically, left and right positions) with respect to the center of the imaging range when the side surface (553) of the cylindrical honeycomb structure (550) is captured by the line sensor camera (530) and to irradiate the imaging range with light at the same time. That is, it is preferable that each pair of the light irradiators (520) is arranged symmetrically with respect to the normal line N of the side surface (553) so that the irradiation angles $\theta_1$ and $\theta_2$ (the angle of the center of the optical axis of the illumination light with respect to the normal line N of the side surface point located in the center of the imaging range) are at the same angle ($\theta_1=\theta_2$) or close to each other ($|\theta_1-\theta_2|=0°$ to $10°$). This is because the inspection accuracy can be improved by uniformly irradiating the side surface with light. The irradiation angles $\theta_1$ and $\theta_2$ are not limited, but can be, for example, in the range of 5° to 30°. Further, it is preferable that each pair of light irradiators (520) has similar irradiation distance and light intensity (Example: the ratio of the irradiation distance of one light irradiator to the irradiation distance of the other light irradiator constituting the pair is 0.9 to 1.1, and the ratio of the light intensity of one light irradiator to the light intensity of the other light irradiator constituting the pair is 0.9 to 1.1).

2-4. Step of Capturing

In the inspection method according to one embodiment of the present invention, a step of repeatedly capturing the reflected light from the side surface (553) with the line sensor camera (530) while the light from the light irradiator (520) is irradiated to the side surface (553) of the cylindrical honeycomb structure (550) and the cylindrical honeycomb structure (550) is rotated around the axis of rotation A of the rotation stage (510) is carried out.

The image data obtained by the repeated capturing of the line sensor camera (530) can be stored in a storage in the controller (570) in association with the position data of the parts of the side surface (553) where the image data is captured. For example, when the rotation operation of the rotation stage (510) is started, the encoder mounted on the rotation stage (510) emits pulses (encoder pulses) at predetermined time intervals. The encoder pulse is passed to the controller (570). The controller (570) gives a capturing instruction to the line sensor camera (530) to execute capturing in synchronization with the timing of receiving the encoder pulse. By carrying out the capturing at the timing when the encoder pulse is emitted in this way, it is possible to generate a data set of image data at the time of individual capturing and the pulse value of the encoder pulse. Since it is possible to specify the position of the part of the side surface (553) corresponding to the image data based on the pulse value, it is possible to associate the image data with the position data.

The capturing direction D by the line sensor camera (530) is not limited, but is preferably set to the direction of the normal line N or the vicinity of the direction of the normal line N at a given point on the side surface (553) from the viewpoint of improving the inspection accuracy. For example, the angle between the normal line N of the side surface point located at the center of the imaging range captured by opening and closing the shutter once and the capturing direction D may be 0° to 10°, and is preferably set to 0° to 5°.

The line sensor camera (530) may be a one-line camera in which a row of pixels is arranged in a straight line. However, from the viewpoint of high inspection accuracy, high sensitivity, and swiftness of inspection, it is preferable to use a multi-line camera or a TDI line camera in which a plurality of rows of pixels are linearly arranged. Further, the line sensor camera (530) may be either a color camera or a monochrome camera, but a monochrome camera is preferable from the viewpoint of obtaining high sensitivity.

In the line sensor camera (530), one row or a plurality of rows of pixels are linearly arranged. Therefore, by capturing with the longitudinal direction in which the pixels are lined up parallel to the extending direction of the central axis of the cylindrical honeycomb structure (550), it is easy to make the focus position uniform in the imaging range. Therefore, by repeatedly capturing the cylindrical honeycomb structure (550) with the line sensor camera (530) while rotating it around the axis of rotation A of the rotation stage (510), it becomes easy to generate an image covering the entire side surface in focus.

It is preferable that the range of the side surface (553) captured by opening and closing the shutter of the line sensor camera (530) at one time covers the entire height of the cylindrical honeycomb structure (550) from the viewpoint of quick inspection. If the range of the side surface (553) captured by the line sensor camera (530) at one time covers the entire height of the cylindrical honeycomb structure (550), it is possible to generate an inspection image of the entire side surface only by rotating the cylindrical honeycomb structure (550) once.

For the step of repeatedly capturing the reflected light from the side surface (553) with the line sensor camera (530) while the cylindrical honeycomb structure (550) is rotated around the axis of rotation A of the rotation stage (510), it is preferable to set the peripheral speed of the side surface (553) so that the inspection can be performed quickly while preventing the inspection image from blurring. Although not limited, in one embodiment, the step of capturing may be carried out while the cylindrical honeycomb structure (550) is rotated at an average peripheral speed of 100 to 1000 mm/sec. In view of the speed of inspection, the lower limit of the average peripheral speed is preferably 100 mm/sec or more, more preferably 200 mm/sec or more, and even more preferably 314 mm/sec or more. On the other hand, the shutter speed of the line sensor camera (530) can be set, for example, from 10 microseconds to 100 milliseconds. If the average peripheral speed is too high, the shutter speed becomes slow with respect to the peripheral speed, and the inspection image tends to be blurred. From this viewpoint, the upper limit of the average peripheral speed is preferably 1000 mm/sec or less, more preferably 800 mm/sec or less, and even more preferably 700 mm/sec or less.

Further, in order to detect fine defects with a high accuracy, it is preferable to use a camera having a fine pixel resolution. A line sensor camera has an advantage that the resolution is high and a high-definition inspection image can be obtained. Specifically, it is preferable to use a line sensor camera having a pixel resolution of 1 to 25 μm/pix. Here, the pixel resolution of a line sensor camera is calculated by the following equation.

Pixel resolution=(length in the longitudinal direction of the field of view captured by opening and closing the shutter once)÷(number of pixels in the longitudinal direction of the line sensor camera)

From the viewpoint of improving the inspection accuracy, the pixel resolution is preferably 25 μm/pix or less (25 μm/pix or finer), more preferably 20 μm/pix or less (20 μm/pix or finer), even more preferably 15 μm/pix or less (15 μm/pix or finer), and even more preferably 10 μm/pix or less (10 μm/pix or finer). The lower limit of pixel resolution is not set in particular, but due to the balance between availability and the field of view obtained by the line sensor, it is usually 1 μm/pix or more (1 μm/pix or coarser), and typically 5 μm/pix or more (5 μm/pix or coarser).

However, as described above, since the cylindrical honeycomb structure has a dimensional error, when the cylindrical honeycomb structure (550) is rotated around the axis of rotation A of the rotation stage (510), the distance between the line sensor camera (530) and the side surface (553) fluctuates slightly. In order to detect fine defects (for example, cracks having a width of about 5 to 25 μm) with a high accuracy, it is necessary to take into account the fluctuation of the distance.

Considering the dimensional error of industrially produced cylindrical honeycomb structures, it is desirable to adjust the depth of field to 0.5 to 5 mm for capturing. If the depth of field is within this range, by repeatedly capturing the cylindrical honeycomb structure (550) with the line sensor camera (530) while rotating it around the axis of rotation A of the rotation stage (510), it becomes easy to generate an image of the entire side surface in focus. Considering the dimensional error, the lower limit of the depth of field is preferably 0.5 mm or more, more preferably 1 mm or more, and even more preferably 3 mm or more. However, if the depth of field is to be increased, it is necessary to reduce the magnification or reduce the aperture to a large extent, and a desired image cannot be obtained. Therefore, the upper limit of the depth of field is preferably 5 mm or less, more preferably 3 mm or less, and even more preferably 2 mm or less.

The depth of field is calculated by the following formula.

[Formula 1]

$$\text{Forward depth of field(mm)} = \frac{(\text{Permissible circle of confusion diameter(mm)} \times F \text{ value} \times \text{Object distance(mm)}^2)}{(\text{Focal distance(mm)}^2 + \text{Permissible circle of confusion diameter(mm)} \times F \text{ value} \times \text{Object distance(mm)})}$$

$$\text{Backward depth of field(mm)} = \frac{\text{Permissible circle of confusion diameter(mm)} \times F \text{ value} \times \text{Object distance(mm)}^2}{\text{Focal distance(mm)}^2 - \text{Permissible circle of confusion diameter(mm)} \times F \text{ value} \times \text{Object distance(mm)}}$$

Depth of field=Forward depth of field+Backward depth of field

In the formula, the permissible circle of confusion diameter means the larger of the "pixel pitch" or the "Airy disk diameter". The aperture value is also called the F value, which is the value obtained by dividing the focal length of the lens by the effective aperture. Therefore, in order to increase the depth of field, the F value (aperture value) may be increased. However, since the Airy disk diameter is represented by the equation: Airy disk diameter=$1.22 \times \lambda \times F$ value (in the equation, $\lambda$ means the wavelength of light), there is a problem that increasing the F value (aperture value) makes the Airy disk the diameter becomes large, and the point image is blurred, and the inspection accuracy is lowered. Therefore, by irradiating the side surface of the cylindrical honeycomb structure with light having a short wavelength as described above and capturing the reflected light, it is possible to reduce the Airy disk diameter while increasing the depth of field.

The aperture value F of the line sensor camera is preferably set in the range of 8 to 16 from the viewpoint of obtaining an appropriate depth of field in combination with the light having a wavelength of 300 to 500 nm. The aperture value F of the line sensor camera is more preferably set in the range of 8 to 11, and even more preferably set in the range of 10 to 11.

Depth of field is also affected by focal distance. As can be seen from the above formula, the shorter the focal distance is, the greater the depth of field becomes. The focal distance is advantageous in that it can be adjusted without affecting the Airy disk diameter. The focal distance is not limited, but can be, for example, 50 to 200 mm, preferably 100 to 150 mm.

Depth of field is also affected by object distance. As can be seen from the above formula, the longer the object distance is, the larger the depth of field becomes, but as the object distance increases, the resolution of the inspection image decreases. Therefore, it is desirable to minimize controlling the depth of field by adjusting the object distance. For example, the object distance may be set to 200 mm to 400 mm, and typically may be set to 250 to 300 mm.

With reference to FIG. 5, the object distance (distance from the front principal point of the lens to the object) and/or the imaging distance (distance from the object to the imaging element of the camera) can be adjusted by moving the X stage (532) on which the line sensor camera (530) is placed. The procedure for adjusting the object distance and the imaging distance will be exemplified as below. First, using a displacement meter (585), the distance between a given point on the side surface (553) of the cylindrical honeycomb structure on the rotation stage (510) after the positioning operation and the displacement meter (585) in the normal direction of the point. Since the coordinate value of the position of the center of gravity O of the first end surface (551) of the cylindrical honeycomb structure (550) has already been measured, the controller (570) calculates the diameter or radius at the measurement point of the cylindrical honeycomb structure (550) based on the distance and the coordinate value of the position of the center of gravity O of the first end surface (551). Further, the controller (570) calculates the current object distance and/or imaging distance based on the coordinate values of the front principal point and/or the position of the imaging surface of the line sensor camera (530), the diameter or radius of the cylindrical honeycomb structure (550), and the position of the center of gravity O of the first end surface (551). Based on the calculation result, the controller (570) moves the X stage (532) so that a desired object distance and/or imaging distance can be obtained. The moving direction of the X stage (532) is preferably the normal direction of the side surface (553) of the cylindrical honeycomb structure (550). The predetermined object distance and/or imaging distance can be input by the user, for example, via the input unit (572). After the predetermined object distance and/or imaging distance is obtained, it is preferable to carry out a step of capturing with the line sensor camera (530) so as to focus on the object distance and/or the imaging distance.

The method for setting conditions of the line sensor camera (530) will be described by way of example. For example, in order to detect a crack having a width of 10 μm, a condition of an inspection image having a pixel resolution of about 10 μm/pix is required. Under this condition, the case where the depth of field is set to about 1 mm is considered. In order to obtain an inspection image having a pixel resolution of about 10 μm/pix, a lens having a pixel pitch of about 5 μm/pix and a magnification of 0.5 times is required. Since the permissible circle of confusion diameter means the larger of the "pixel pitch" or the "Airy disk diameter", it can be understood that the Airy disk diameter should be adjusted when using a camera having a sufficiently small pixel pitch. Considering the detection of cracks having a width of 10 μm, for example, if the permissible circle of confusion diameter=Airy disk diameter is set to 5 μm, cracks can be detected accurately. As described above, the Airy disk diameter is represented by the Airy disk diameter=$1.22 \times \lambda \times F$ value. Therefore, for example, when using light having a wavelength of 380 nm, if the F value is selected to be 11, it can be understood that the Airy disk diameter is about 5 μm. At this time, for example, if the focal distance is 100 mm and the object distance is 300 mm, the depth of field can be set to about 1 mm.

As described above, the cylindrical honeycomb structure (550) may have a dimensional error. Therefore, when the cylindrical honeycomb structure (550) is rotated once around the axis of rotation A of the rotation stage (510), the object distance may fluctuate. Even if the depth of field is set so as to cope with normal dimensional error of the cylindrical honeycomb structure (550), the fluctuation of the object distance becomes large in some cases, and the amount of change in the distance may exceed the depth of field. In that case, an out-of-focus part occurs in the inspection image. Therefore, in preparation for such a case, in the step of repeatedly capturing the reflected light from the side surface (553) of the cylindrical honeycomb structure (550) with the line sensor camera (530), it is preferable to carry out the following steps with the displacement meter (585).

According to one embodiment of the present invention, the inspection method comprises:

a step of continuously measuring a distance between any point on the side surface (553) and a displacement meter in the normal direction at the point using the displacement meter (585) while carrying out the step of repeatedly capturing the reflected light from the side surface (553) of the cylindrical honeycomb structure (550) with the line sensor camera (530), and determining whether or not an amount of change in the distance during one rotation of the cylindrical honeycomb structure (550) exceeds the depth of field; and if the depth of field is exceeded, a step of adjusting an imaging distance so that at least a part of the side surface (553) which is captured with the depth of field exceeded is within the range of the depth of field, and then re-rotating the cylindrical honeycomb structure (550) around the axis of rotation and capturing at least the part with the line sensor camera (530).

For example, the step of determination can be carried out using the inspection system (500) as follows.

First, the controller (570) of the inspection system (500) calculates the forward depth of field and the backward depth of field based on various conditions for carrying out the step of capturing. The relationship between the various conditions and the depth of field may be calculated in advance, and the calculation result may be registered in the storage of the controller (570).

Next, while carrying out the step of repeatedly capturing the reflected light from the side surface (553) of the cylindrical honeycomb structure (550) with the line sensor camera (530), the controller (570) stores the forward displacement and the backward displacement of the side surface (553) respectively with respect to the focus plane in association with the point on the side surface (553) where these displacements were measured by the displacement meter (585). The point on the side surface (553) where the displacement was measured can be detected by using an encoder. However, the point on the side surface (553) where the displacement is measured may not be specified, and only the displacement may be stored.

Next, the controller (570) conducts a determination by comparing the forward depth of field with the forward displacement with respect to the focus plane of the side surface (553), and specifies the part of the side surface (553) captured with the forward displacement exceeding the forward depth of field. Similarly, the controller (570) conducts a determination by comparing the backward depth of field with the backward displacement with respect to the focus plane of the side surface (553), and specifies the part of the side surface (553) captured with the backward displacement exceeding the backward depth of field. However, it is not always necessary to specify the part of the side surface (553) that exceeds the depth of field.

In the step of determination, when the displacement meter (585) is used to measure the distance from a given point on the side surface (553) of the cylindrical honeycomb structure (550) to the displacement meter (585) in the normal direction of the point, the point on the side surface (553) that serves as a reference for measuring the distance is preferably any point on the lower half of the side surface (553) of the cylindrical honeycomb structure (550). This is due to the following reasons.

As described above, the positioning operation of the cylindrical honeycomb structure (550) is carried out based on the center of gravity of the first end surface (551) specified by using the camera (580) provided above the first end surface (551) on the topside of the cylindrical honeycomb structure (550). Therefore, when the squareness of the cylindrical honeycomb structure (550) is large, the lower half of the cylindrical honeycomb structure (550) has a large deviation from the axis of rotation A of the rotation stage (510). Therefore, when the cylindrical honeycomb structure (550) is rotated, the lower half is largely eccentric, and the measured value of the displacement meter becomes large. Therefore, by measuring the distance from any point in the lower half of the side surface (553) of the cylindrical honeycomb structure (550) where the measured value of the displacement meter tends to be large to the displacement meter (585), the accuracy of the step of determination can be improved.

In the step of determination, when the displacement meter (585) is used to measure the distance from a given point on the side surface (553) of the cylindrical honeycomb structure (550) to the displacement meter (585) in the normal direction of the point, assuming that the lower end (second end surface (552)) of the side surface (553) of the cylindrical honeycomb structure (550) has a height of 0 and the upper end (first end surface (551)) has a height H, the point on the side surface (553) that serves as a reference for measuring the distance is more preferably set to any point in the range of 0 to 0.2H, and even more preferably set to any point in the range of 0 to 0.1H.

For example, the step of re-capturing can be carried out using the inspection system (500) as follows.

The controller (570) of the inspection system (500) adjusts the imaging distance so that at least a part of the side surface (553) captured with the depth of field exceeded, that is, a part of the side surface captured with the forward depth of field and/or the backward depth of field exceeded, is within the range of the depth of field. Next, the controller (570) operates the inspection system (500) to capture at least the part with the line sensor camera (530) while re-rotating the cylindrical honeycomb structure (550) around the axis of rotation A. At this time, the imaging range may be the entire side surface (553). If the part of the side surface (553) captured with the depth of field exceeded is specified, the imaging range may be limited on a condition in which the part is included. It is preferable that the controller (570) operates the inspection system to repeat the adjustment of the imaging distance and capturing until the entire side surface (553) of the cylindrical honeycomb structures (550) is captured within the range of the depth of field.

2-5. Step of Generating Image

In the inspection method according to one embodiment of the present invention, a step of generating an inspection image of the entire side surface (553) based on a result of the step of capturing the reflected light from the side surface (553) with the line sensor camera (530) is carried out. For example, the controller (570) may be configured to generate the inspection image based on the image data obtained as a result of the step of capturing with the line sensor camera (530). The inspection image can be displayed on the screen (540) of a display device such as an LCD or an organic EL display.

To the inspection image, image processing such as filter processing may be executed as necessary in order to facilitate the determination of defects in the next step. Examples of the filter processing include binarization processing, shading correction, contraction/expansion processing, and the like. Image processing may be configured to be performed by the controller (570).

By arranging a large number of image data obtained from the start to the end of capturing in chronological order, it is possible to generate an inspection image of the entire side surface of the cylindrical honeycomb structure. The image data obtained by capturing one round of the cylindrical honeycomb structure with the line sensor camera has a large volume. Therefore, if the image processing is performed after the step of capturing is completed, the image processing takes time and the inspection speed is lowered. Therefore, it is preferable to execute image processing in parallel with the step of capturing for every predetermined volume of image data (for example, every 5% to 30% of the volume of image data for capturing one round of the cylindrical honeycomb structure). A plurality of image data after image processing performed by division may be subject to integration processing.

2-6. Step of Determining Defects

Figure 7:
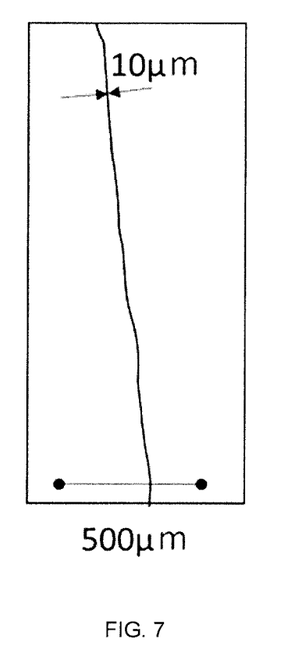
FIG. 7 is a schematic view of a micrograph of a fine crack having a width of about 10 μm.

In the inspection method according to one embodiment of the present invention, a step of determining presence or absence of defects on the side surface (553) of the cylindrical honeycomb structure (550) based on the inspection image is carried out. The step of determining the presence or absence of defects may be visually performed by an inspector, and it is also possible to have the controller (570) conduct the determination based on a preset criterion. In one embodiment, the step of determining the presence or absence of defects on the side surface (553) based on the inspection image includes determining the presence or absence of cracks having a width of 5 to 25 μm. Here, the width of a crack refers to the maximum value of the length in the direction orthogonal to the length direction of the crack. As an example, FIG. 7 shows a schematic diagram of a micrograph of a fine crack having a width of about 10 μm.

When determining the presence or absence of cracks having a width of 5 to 25 μm by the controller (570), for example, a method of binarizing the inspection image so that the part with defects such as cracks can be distinguished from the other parts, and determining the presence or absence cracks having a width of 5 to 25 μm using the inspection image after the binarization, can be mentioned.

According to one embodiment of the inspection method according to the present invention, the obtained inspection image can have a high resolution suitable for detecting fine cracks, so that defects such as these fine cracks can be detected with a high inspection accuracy.

DESCRIPTION OF REFERENCE NUMERALS

100 Cylindrical honeycomb structure
102 Outer peripheral side wall
103 Side surface
104 First end surface
106 Second end surface
108 Cell
112 Partition wall
200 Cylindrical honeycomb structure
202 Outer peripheral side wall
203 Side surface
204 First end surface
206 Second end surface
208a First cell
208b Second cell 212 Partition wall
500 Inspection system
510 Rotation stage
510a θ stage
510b X stage
510c Y stage
510d Z stage
512 Placing surface
520 Light irradiator
530 Line sensor camera
532 X stage
540 Screen
550 Cylindrical honeycomb structure
551 First end surface
552 Second end surface
553 Side surface
560 Area camera
570 Controller
572 Input unit
580 Light irradiator
585 Displacement meter
590 Frame
591 Placing surface
592 Opening

The invention claimed is:

1. An inspection method for a cylindrical honeycomb structure, comprising:
   a step of preparing a cylindrical honeycomb structure made of ceramics, which comprises a first end surface, a second end surface, and a side surface;
   a step of placing the cylindrical honeycomb structure on a rotation stage so that the first end surface is on the topside and a distance between a center of gravity of the first end surface and an axis of rotation of the rotation stage is 0.5 mm or less;
   a step of irradiating the side surface of the cylindrical honeycomb structure placed on the rotation stage with light having a wavelength of 300 to 500 nm;
   a step of repeatedly capturing a reflected light from the side surface with a line sensor camera having a pixel resolution of 1 to 25 μm/pix while the light is irradiated to the side surface and the cylindrical honeycomb structure is rotated around the axis of rotation, with a depth of field of the line sensor camera being adjusted to 0.5 to 5 mm;
   a step of generating an inspection image of the entire side surface based on a result of the step of capturing the reflected light with the line sensor camera; and
   a step of determining presence or absence of defects on the side surface based on the inspection image.

2. The inspection method for a cylindrical honeycomb structure according to claim 1, wherein the step of repeatedly capturing the reflected light from the side surface with the line sensor camera is carried out by setting an aperture value F of the line sensor camera in a range of 8 to 16.

3. The inspection method for a cylindrical honeycomb structure according to claim 1, wherein the step of determining the presence or absence of defects on the side surface based on the inspection image comprises determining presence or absence of cracks having a width of 5 to 25 μm.

4. The inspection method for a cylindrical honeycomb structure according to claim 1, wherein the rotation stage is capable of moving in X, Y, and Z directions, and the step of placing the cylindrical honeycomb structure on the rotation stage comprises:
   a step of measuring a position of the center of gravity of the first end surface using an area camera;
   a step of moving the axis of rotation of the rotation stage directly below the position of the center of gravity of the first end surface based on a measured position of the center of gravity of the first end surface; and
   a step of raising the rotation stage relative to the cylindrical honeycomb structure and lifting the cylindrical honeycomb structure from a side of the second end surface.

5. The inspection method for a cylindrical honeycomb structure according to claim 1, comprising:
   a step of continuously measuring a distance between any point on the side surface and a displacement meter in the normal direction at the point using the displacement meter while carrying out the step of repeatedly capturing the reflected light from the side surface with the line sensor camera, and determining whether or not an amount of change in the distance during one rotation of the cylindrical honeycomb structure exceeds the depth of field; and
   if the depth of field is exceeded, a step of adjusting an imaging distance so that at least a part of the side surface which is captured with the depth of field exceeded is within the range of the depth of field, and then re-rotating the cylindrical honeycomb structure around the axis of rotation and capturing at least the part with the line sensor camera.

6. The inspection method for a cylindrical honeycomb structure according to claim 5, wherein the displacement meter measures a distance between any point in a lower half of the side surface of the cylindrical honeycomb structure and the displacement meter in the normal direction at the point.

7. The inspection method for a cylindrical honeycomb structure according to claim 1, wherein the step of repeatedly capturing the reflected light from the side surface with the line sensor camera is carried out while rotating the cylindrical honeycomb structure at an average peripheral speed of 100 to 1000 mm/sec.

8. The inspection method for a cylindrical honeycomb structure according to claim 1, wherein an illuminance on the side surface of the cylindrical honeycomb structure irradiated with the light is 500,000 lx or more.

9. The inspection method for a cylindrical honeycomb structure according to claim 1, wherein the light irradiated to the side surface of the cylindrical honeycomb structure is irradiated by a line illumination whose longitudinal direction extends in a direction parallel to a central axis direction of the cylindrical honeycomb structure.

10. An inspection system for carrying out the inspection method for a cylindrical honeycomb structure according to claim 1, comprising:
    a rotation stage capable of moving in X, Y, and Z directions;
    a light irradiator for irradiating the side surface of the cylindrical honeycomb structure with light;
    a line sensor camera for capturing a reflected light from the side surface of the cylindrical honeycomb structure; and
    a screen capable of displaying an inspection image.

* * * * *